Sept. 12, 1933.  A. SISCO  1,926,459
ARTIFICIAL BAIT
Filed Dec. 9, 1929

Alexander Sisco, Inventor

By U. R. McYee
Attorney

Patented Sept. 12, 1933

1,926,459

UNITED STATES PATENT OFFICE 1,926,459

ARTIFICIAL BAIT

Alexander Sisco, Lorain, Ohio

Application December 9, 1929. Serial No. 412,901

2 Claims. (Cl. 43—46)

The present invention relates to improvements in fish lures and has for its principal object to provide an artificial bait constructed to simulate a minnow which when drawn through the water will produce a wiggling motion simulating very closely the movement of a live minnow swimming in the water.

Another important object of the invention resides in the provision of an artificial bait of the above mentioned character wherein the same includes a pliable or flexible bait body shaped to simulate a minnow, a solid head forming member being attached to the forward end of a flexible body and to the forward end of which body is attached the fish line; a transparent shield being arranged at the forward end of the head in such a manner as to effect the wiggling motion of the artificial bait when the latter is drawn through the water.

A still further object is to provide an artificial bait of the above mentioned character wherein a transparent fin is adapted to be carried by the fish hook whereby to cause the hook to float near the tail of the flexible body of the artificial bait as the same is being drawn through the water.

A further and important object resides in the provision of an artificial bait of the above mentioned character which is simple in construction, inexpensive, strong and durable, and further well adapted for the purposes for which it is designed.

Other objects and advantages of the invention will become apparent during the course of the following description taken in connection with the accompanying drawing.

Figure 1:
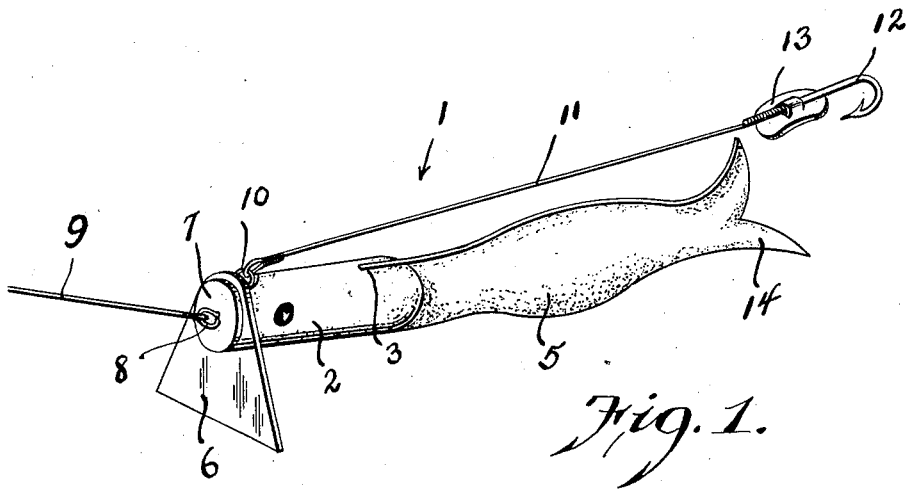
Figure 2:
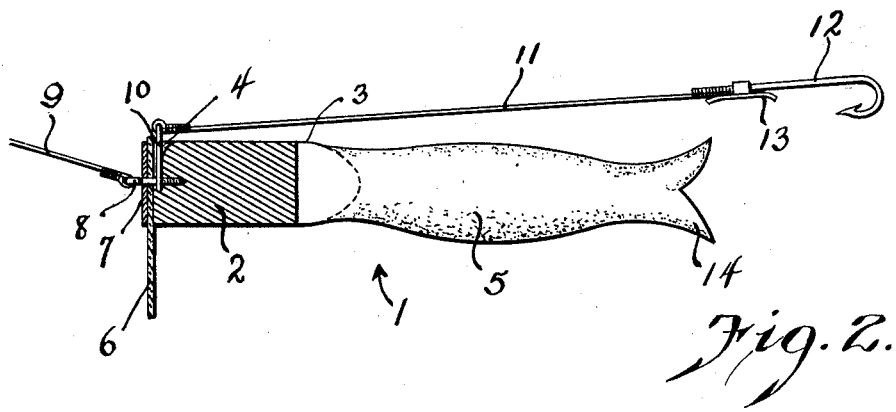

In the accompanying drawing, wherein like reference characters designate corresponding parts throughout the several views, Figure 1 represents a perspective view of the artificial bait embodying my invention, and Figure 2 is a view partly in elevation and partly in section for more clearly disclosing the relationship of the transparent shield with respect to the forward end of the solid head and for further illustrating the manner in which the several parts are connected together.

In the drawing, wherein for the purpose of illustration is shown the preferred embodiment of my invention, the numeral 1 designates generally my improved artificial bait, the same comprising an elongated cylindrical shaped head 2, the rear end of which is rounded and is furthermore slit longitudinally as indicated at 3 in Figure 2 for a purpose to be presently described. The top portion of the head 2 is cut away at the forward end thereof as indicated at 4, also in Figure 2 of the drawing. The head may have its exterior painted to simulate the head of a minnow or any other form of live fish bait.

Forming a salient part of the present invention is the artificial bait body 5 which is shaped to simulate a minnow, said body being made of flexible or pliable material such as rubber. The forward end of the flexible or pliable body 5 is cemented or otherwise secured within the slotted rear end portion 3 of the head 2 and as is clearly shown in Figure 2, the forward edge of the flexible body abuts the closed end of the slit 3.

Adapted to be disclosed vertically against the forward straight edge or end of the head 2 is the apex portion of a substantially triangularly shaped shield 6 that is constructed preferably of celluloid although any other suitable transparent material may be substituted, if desired. A washer 7 is disposed against the outer face of the transparent shield 6 and extending through registering openings formed in the apex portion of the transparent shield and the washer 7 is the shank of a suitable screw eye 8. The threaded end of this shank is threaded into the forward end of the solid body 2.

The screw eye 8 in addition to providing a means for facilitating the attachment of a fish line 9 to the artificial bait 1 also constitutes a means for properly securing the transparent shield 6 against the forward end of the head 2.

The screw eye 8 provides an additional means for facilitating the attachment of a fish hook to the artificial bait, and to this end, an eye member 10 is arranged vertically in the cutout portion 4, the lower end of said eye member having the shank of the screw eye passing therethrough while the upper end of said eye member projects above the top of the cylindrical head 2 and attached to the projecting end of this eye member 10 is one end of a short line 11, to the other end of which is attached a conventional fish hook 12.

The shank of the fish hook 12 carries thereon the fin 13 formed of celluloid or other transparent material, this fin serving as a float to maintain the hook 12 near the tail portion 14 of the flexible body 5.

In use, the artificial bait may be drawn through the water in the customary way and the resistance offered by the downwardly projecting transparent shield 6 will serve to effect the swimming motion of the minnow and by forming the body of pliable material, the same will wiggle during the movement of the artificial bait through the water. The movement of the artificial bait through the water will simulate very closely the movement of a live minnow swimming in the water and furthermore, the transparent fin that is associated with the shank of the hook will maintain the hook near the tail end of the flexible body of the bait.

An artificial bait of the above mentioned character will at all times be positive and efficient in its operation and due to its simplicity, the same can be constructed and sold at a very low cost.

While I have shown the preferred embodiment of my invention, it is to be understood that various changes in the size, shape and arrangement of parts may be resorted to without departing from the spirit of the invention and the scope of the appended claims.

Having thus described my invention, what I claim as new is,

1. An artificial bait comprising a head having a recess in one end, a flexible body secured to the the opposite end of the head, a transparent shield secured over the recess in the end of the head and projecting at one side of the head, said shield being secured by a screw eye to which a fish line may be attached, a fastening device held in the recess by said screw eye in the end of the head back of the shield, and a hook-carrying line attached to said fastening device.

2. An artificial bait comprising a solid head, a flexible body attached to the rear portion of the head, a depending pyramidal shaped shield arranged at substantially right angles to the head and bearing against the adjacent end thereof for imparting a wiggling motion to the artificial bait, a fastening device projecting from one side of the head for attachment to a fish hook, and a line attaching screw eye extending through the shield and into the head and engaging the fastening device for supporting the shield on the head and preventing displacement of said fastening device.

ALEXANDER SISCO.